US008539223B2

(12) United States Patent  
Dohi et al.

(10) Patent No.: US 8,539,223 B2  
(45) Date of Patent: Sep. 17, 2013

(54) NETWORK CONFIGURATION SETTING GENERATION SYSTEM, DEVICE, AND METHOD

(75) Inventors: Makoto Dohi, Chigasaki (JP); Masamichi Tanji, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1188 days.

(21) Appl. No.: 11/372,632

(22) Filed: Mar. 10, 2006

(65) Prior Publication Data

US 2006/0209338 A1 Sep. 21, 2006

(30) Foreign Application Priority Data

Mar. 18, 2005 (JP) ................................. 2005-080235  
Aug. 19, 2005 (JP) ................................. 2005-239029

(51) Int. Cl.  
*G06F 21/00* (2013.01)

(52) U.S. Cl.  
USPC ........................................................ 713/151

(58) Field of Classification Search  
USPC ............................................. 713/151; 726/1  
See application file for complete search history.

(56) References Cited

U.S. PATENT DOCUMENTS

| 8,301,875 B2 * | 10/2012 | Sakai | 713/153 |
| 2003/0204591 A1 * | 10/2003 | Ueda et al. | 709/224 |
| 2004/0059844 A1 * | 3/2004 | Jones et al. | 710/15 |
| 2005/0044410 A1 * | 2/2005 | Yan | 713/201 |
| 2005/0195844 A1 * | 9/2005 | Takada et al. | 370/411 |
| 2006/0041627 A1 * | 2/2006 | Tu | 709/206 |
| 2007/0058642 A1 * | 3/2007 | Eisink | 370/401 |
| 2009/0024745 A1 * | 1/2009 | Short et al. | 709/227 |

FOREIGN PATENT DOCUMENTS

| JP | 2000-22775 A | 1/2000 |
| JP | 2001-094603 A | 4/2001 |
| JP | 2005-045403 A | 2/2005 |
| WO | 2005015827 A1 | 2/2005 |

OTHER PUBLICATIONS

IT Media, The Four way of Proxy Setting Web Browser—WPAD Recommendation, Oct. 19, 2002, pp. 2-11.  
Microsoft Corporation, Microsoft Small Business Server 2000 Resource Kit, Aug. 6, 2001, pp. 7-48.

* cited by examiner

*Primary Examiner* — Jeffrey Pwu  
*Assistant Examiner* — Anthony Brown  
(74) *Attorney, Agent, or Firm* — Canon USA, Inc., IP Division

(57) ABSTRACT

In a communication system of the present invention, second setting information is automatically generated according to first setting information used for performing predetermined processing between at least two devices when the first setting information is set to a first device of the at least two devices, where the second setting information is generated for a second device of the at least two devices. Then, the communication system transmits the automatically-generated second setting information to the second device. Otherwise, the communication system writes the automatically-generated second setting information onto a portable recording medium so that the second device can read the second setting information from the portable recording medium.

11 Claims, 10 Drawing Sheets

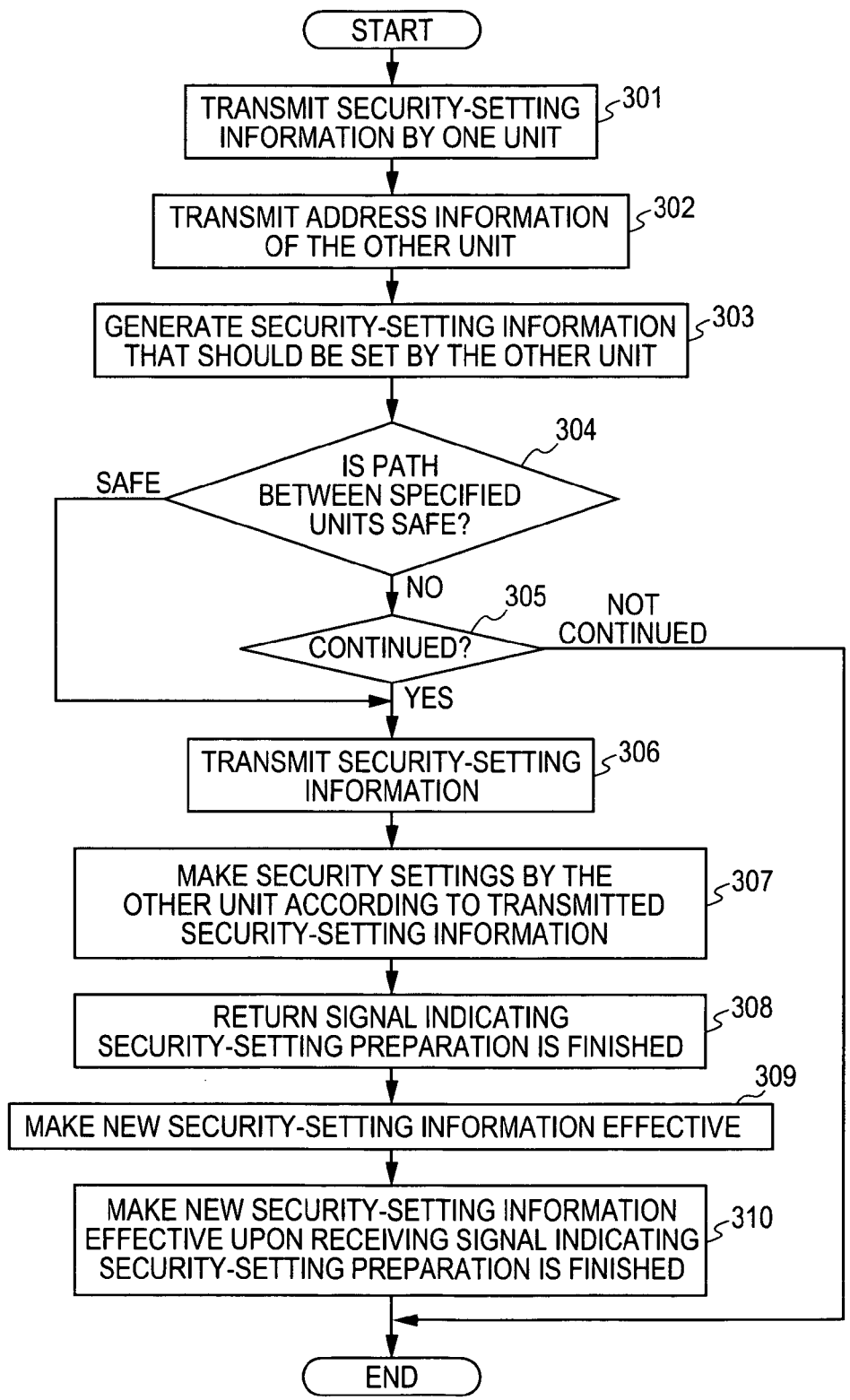

FIG. 4

| | | |
|---|---|---|
| 401 | DESTINATION ADDRESS | DESTINATION ADDRESS OF DATA |
| 402 | DESTINATION-ADDRESS NETMASK | EFFECTIVE bit LENGTH OF DESTINATION ADDRESS |
| 403 | SOURCE ADDRESS | SOURCE ADDRESS OF DATA |
| 404 | SOURCE-ADDRESS NETMASK | EFFECTIVE bit LENGTH OF SOURCE ADDRESS |
| 405 | PROTOCOL NUMBER | PROTOCOL NUMBER OF DATA |
| 406 | DESTINATION PORT NUMBER | DESTINATION PORT NUMBER |
| 407 | SOURCE PORT NUMBER | SOURCE PORT NUMBER |
| 408 | PROCESSING METHOD | DATA-PROCESSING METHOD PROCESSING METHOD USED WHEN SECURITY PROCESSING IS PERFORMED |
| 409 | BIDIRECTIONAL TRANSMISSION | ON MODE AND OFF MODE CAN BE SET WHEN IN ON MODE, SETTING ON ADDRESS AND PORT NUMBER IS AUTOMATICALLY MADE EFFECTIVE, WHERE DESTINATION AND SOURCE ARE INTERCHANGED |

FIG. 5

| | | |
|---|---|---|
| 501 | KEY-EXCHANGE MODE | SPECIFY MODE |
| 502 | OTHER-END ADDRESS | SPECIFY OTHER-END ADDRESS |
| 503 | PRE-SHARED PRIVATE KEY | ONE-BYTE CHARACTER STRING |
| 504 | PROPOSAL | SPECIFY DETAILS ON PROCESSING FOR USE (TWO OR MORE PROPOSALS MAY BE SPECIFIED) |

FIG. 6

| | |
|---|---|
| AUTHENTICATION ALGORITHM | SPECIFY TYPE OF AUTHENTICATION ALGORITHM |
| ENCRYPTED ALGORITHM | SPECIFY TYPE OF ENCRYPTED ALGORITHM |
| LIFETIME TYPE | TIME OR COMMUNICATION AMOUNT |
| LIFE TIME | SPECIFY IN SECOND OR KILOBYTE (ON THE BASIS OF LIFETIME TYPE) |

FIG. 7

| DESTINATION ADDRESS | DESTINATION ADDRESS OF DATA |
|---|---|
| DESTINATION-ADDRESS NETMASK | EFFECTIVE bit LENGTH OF DESTINATION ADDRESS |
| SOURCE ADDRESS | SOURCE ADDRESS OF DATA |
| SOURCE-ADDRESS NETMASK | EFFECTIVE bit LENGTH OF SOURCE ADDRESS |
| PROTOCOL NUMBER | PROTOCOL NUMBER OF DATA |
| DESTINATION PORT NUMBER | DESTINATION PORT NUMBER |
| SOURCE PORT NUMBER | SOURCE PORT NUMBER |
| PROCESSING METHOD | DATA-PROCESSING METHOD PROCESSING METHOD USED WHEN SECURITY PROCESSING IS PERFORMED |
| BIDIRECTIONAL TRANSMISSION | ON MODE AND OFF MODE CAN BE SET WHEN IN ON MODE, SETTING ON ADDRESS AND PORT NUMBER IS AUTOMATICALLY MADE EFFECTIVE, WHERE DESTINATION AND SOURCE ARE INTERCHANGED |
| START TIME | 12.23.45 ON DECEMBER 28, 2004 |
| ADDRESS OF NTP SERVER | 192.168.1.102 |

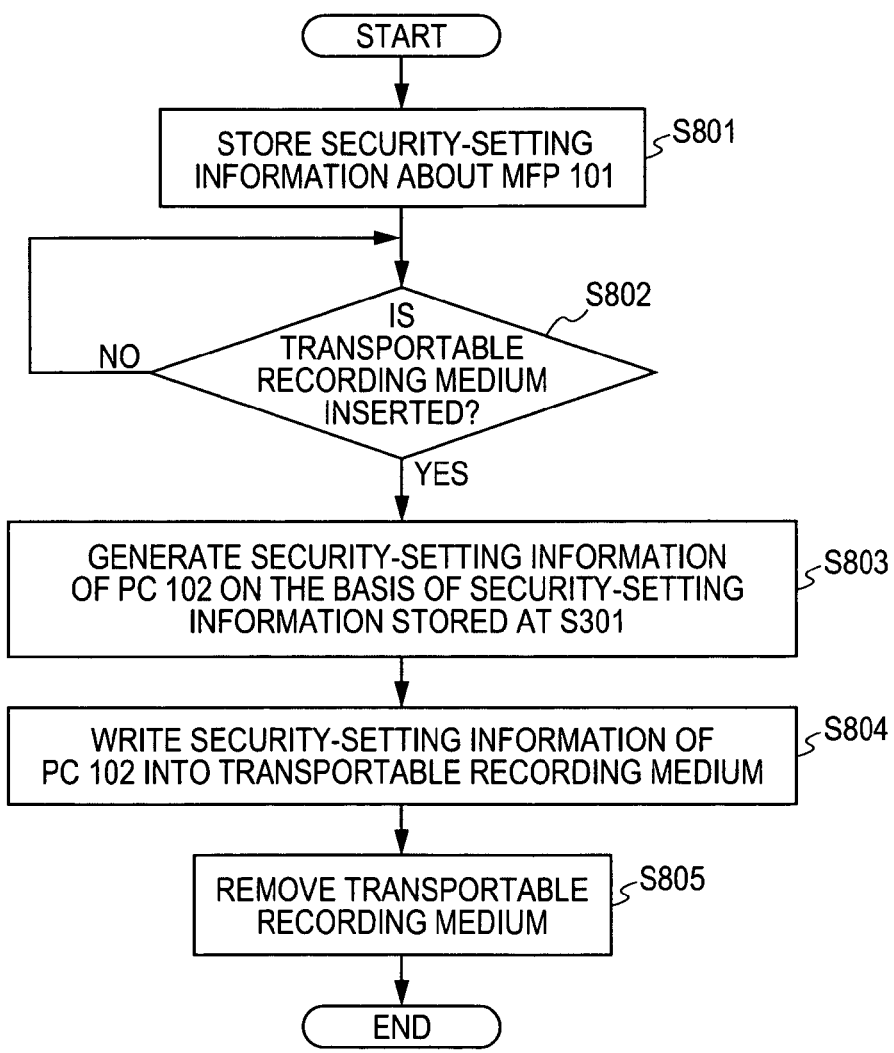

FIG. 12

| | | |
|---|---|---|
| 1201 | DESTINATION ADDRESS | DESTINATION ADDRESS OF DATA |
| 1202 | DESTINATION-ADDRESS NETMASK | EFFECTIVE bit LENGTH OF DESTINATION ADDRESS |
| 1203 | SOURCE ADDRESS | SOURCE ADDRESS OF DATA |
| 1204 | SOURCE-ADDRESS NETMASK | EFFECTIVE bit LENGTH OF SOURCE ADDRESS |
| 1205 | PROTOCOL NUMBER | PROTOCOL NUMBER OF DATA |
| 1206 | DESTINATION PORT NUMBER | DESTINATION PORT NUMBER |
| 1207 | SOURCE PORT NUMBER | SOURCE PORT NUMBER |
| 1208 | PROCESSING METHOD | DATA-PROCESSING METHOD PROCESSING METHOD USED WHEN SECURITY PROCESSING IS PERFORMED |
| 1209 | BIDIRECTIONAL TRANSMISSION | ON MODE AND OFF MODE CAN BE SET WHEN IN ON MODE, SETTING ON ADDRESS AND PORT NUMBER IS AUTOMATICALLY MADE EFFECTIVE, WHERE DESTINATION AND SOURCE ARE INTERCHANGED |

FIG. 13

| | | |
|---|---|---|
| 1301 | KEY-EXCHANGE MODE | SPECIFY MODE |
| 1302 | OTHER-END ADDRESS | SPECIFY OTHER-END ADDRESS |
| 1303 | PRE-SHARED PRIVATE KEY | ONE-BYTE CHARACTER STRING |
| 1304 | PROPOSAL | SPECIFY DETAILS ON PROCESSING FOR USE (TWO OR MORE PROPOSALS MAY BE SPECIFIED) |

NETWORK CONFIGURATION SETTING GENERATION SYSTEM, DEVICE, AND METHOD

BACKGROUND OF THE INVENTION

1. Field of the Invention

The present invention relates to a communication system, a communication device, and a communication method, and particularly relates to a setting technology adapted to set setting information used for performing predetermined processing between two devices to at least one of the two devices, when the predetermined processing is performed between the two devices.

2. Description of the Related Art

In the past, various communication methods were used for transferring data with security between two devices via a communication network. For example, a system using secure sockets layer (SSL), a system using a public key and a private key, and so forth have been used. The above-described systems are disclosed in Japanese Patent Laid-Open No. 2000-22775, for example.

Further, security-related technologies adapted to increase security strength and prevent an ordinary user using at least one of the devices from being aware that settings are made, so as to ensure security, have been used.

However, according to the known technologies, especially security-related technologies performed at a hierarchically low-level of a data-transfer system, it is difficult to make settings used for transferring data with security. Further, settings are often made only for data transfer performed between two devices (on one-to-one basis). In such cases, an error easily occurs in the settings. Therefore, even though an administrator of the system has confidence in reliability of the data-transfer settings, the system often fails to transfer data due to the error in the settings.

SUMMARY OF THE INVENTION

When setting information used for performing predetermined processing between a plurality of devices is set to each of the plurality of devices, the present invention allows for setting the setting information to at least one of the plurality of devices correctly and automatically.

A communication system according to an embodiment of the present invention includes an information-generation unit configured to generate second setting information according to first setting information used for performing predetermined processing between at least two devices when the first setting information is set to a first device of the at least two devices, the second setting information being generated for a second device of the at least two devices, an information-transmission unit configured to transmit the second setting information generated by the information-generation unit to the second device, and a setting unit configured to set the second setting information transmitted from the information-transmission unit to the second device.

Further, a communication system according to another embodiment of the present invention includes an information-generation unit configured to generate second setting information according to first setting information used for performing predetermined processing between at least two devices when the first setting information is set to a first device of the at least two devices, the second setting information being generated for a second device of the at least two devices, the second device being paired with the first device, an information-write unit configured to write the second setting information generated by the information-generation unit onto at least one portable recording medium inserted into the first device, an information-read unit configured to read the second setting information from the portable recording medium when the portable recording medium is inserted into the second device, and a setting unit configured to set the second setting information read by the information-read unit to the second device.

Further features of the present invention will become apparent from the following description of exemplary embodiments with reference to the attached drawings.

BRIEF DESCRIPTION OF THE DRAWINGS

FIG. 3 is a flowchart showing exemplary operations of a network system according to a first embodiment of the present invention.

FIG. 4 shows example setting information for generation, according to an aspect of the present invention.

FIG. 5 shows example specifics of setting information for generation, according to an aspect of the present invention.

FIG. 6 also shows example specifics of setting information for generation, according to an aspect of the present invention.

FIG. 7 shows other example setting information for generation, according to an aspect of the present invention.

FIG. 8 is a flowchart showing exemplary operations of an MFP according to a second embodiment of the present invention.

FIG. 12 shows a record area storing setting information transmitted according to a security-setting menu, according to an aspect of the present invention.

FIG. 13 shows another record area storing setting information transmitted according to the security-setting menu, according to an aspect of the present invention.

DESCRIPTION OF THE EMBODIMENTS

Hereinafter, embodiments of the present invention will be described with reference to the attached drawings.

First Exemplary Embodiment

Figure 1:
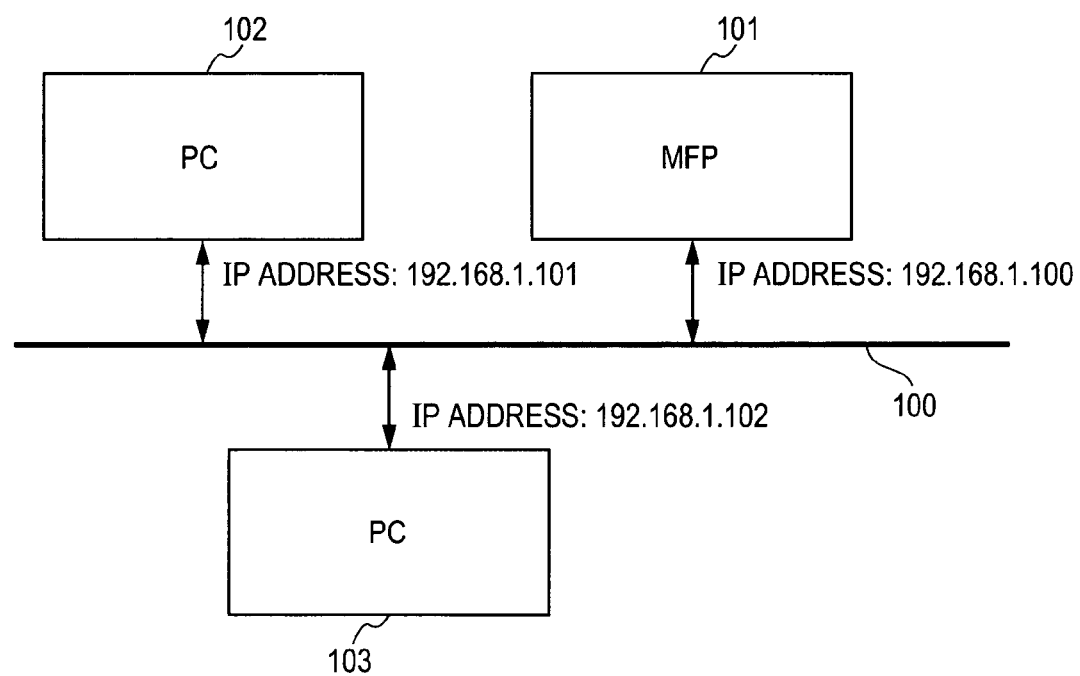
FIG. 1 shows an exemplary configuration of a network system according to the embodiments of the present invention.

FIG. 1 shows the configuration of an exemplary network system using a communication system according to any one of the embodiments of the present invention. As shown in FIG. 1, the above-described network system may have various devices connected thereto the network including a multifunction peripheral (hereinafter referred to as an MFP) 101, personal computers (hereinafter referred to as PCs) 102 and 103, and so forth. Further, the MFP 101, the PCs 102 and 103, and so forth are connected to one another via a local-area network (hereinafter referred to as a LAN) 100.

In the network system shown in FIG. 1, an address is assigned to each of the above-described devices (the MFP 101 and the PCs 102 and 103) connected to the LAN 100. Here, a network connecting the MFP 101, the PCs 102 and 103, and so forth to one another is not limited to the above-described LAN 100, but can be an arbitrary network.

Figure 2:
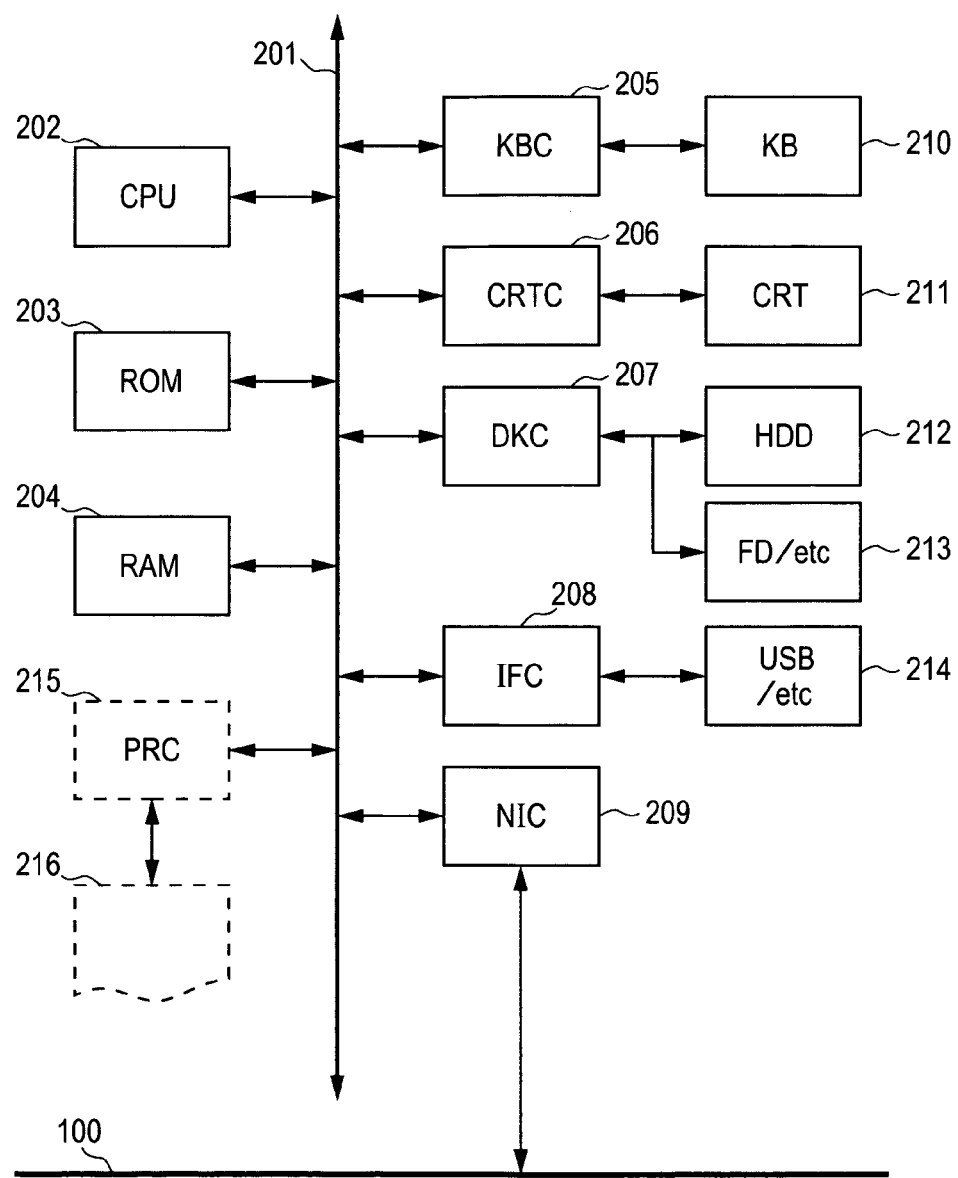
FIG. 2 schematically shows exemplary architectures of the multifunction peripheral (MFP), and personal computers (PCs) from FIG. 1.

FIG. 2 is a block diagram schematically showing the exemplary architectures of the MFP 101, the PCs 102 and 103, and so forth that are shown in FIG. 1.

As shown in FIG. 2, each of the above-described devices including the MFP 101, the PCs 102 and 103, and so forth includes a central-processing unit (CPU) 202 and a read-only memory (ROM) 203 provided, as non-volatile storage such as a ROM, and a random-access memory (RAM) 204 provided, as temporary storage such as a RAM. Further, each of the above-described devices includes an input-unit controller (KBC) 205 for an input unit (KB) 210 and a display-unit controller (CRTC) 206 for a display unit (CRT) 211. Further, each of the above-described devices includes a disk-unit controller (DKC) 207 for a hard-disk drive (HDD) 212 and a disk unit (FD/etc) 213. Further, each of the above-described devices includes an interface controller (IFC) 208 for a local-interface (USB/etc) 214 and a network-unit controller 209 including a network-interface card (NIC). The above-described functional units are connected to one another via a system bus 201 so that the functional units can communicate with one another.

Further, since the MFP 101 performs processing such as printing, the MFP 101 includes a print controller (PRC) 215 and a printer engine 216 configured to actually perform printing. Further, the MFP 101 may include various units including a scanner, a facsimile, and so forth that exert no influence on advantages of the present invention.

A CPU 202 collectively controls the above-described functional units connected to the system bus 201 by executing at least one program recorded onto the ROM 203 and/or the HDD 212, or at least one program supplied by the FD 213. That is to say, the CPU 202 reads at least one processing program adapted to perform desired operations from the ROM 203, the HDD 212, or the FD 213 and executes the processing program, whereby the CPU 202 performs control for performing the desired operations. The above-described functional units operate in liaison with one another according to an instruction or the like transmitted from the CPU 202 so that the entire device operates.

The ROM 203 stores an instruction (program) or the like read by the CPU 202. Further, in the MFP 101, information about fonts or the like used for the printing may be stored in the ROM 203. The RAM 204 functions, as a main memory, a work area, and so forth of the CPU 202. If the power of the unit is turned off, data stored in the RAM 204 may be lost.

The KBC 205 processes information transmitted from the input unit (KB) 210 including a keyboard, a mouse, and so forth. The CRTC 206 controls the display unit (CRT) 211 including a CRT display unit, a liquid-crystal-display unit, and so forth. The DKC 207 controls the fixed HDD 212 and/or the removable disk unit (FD/etc) 213 such as a flexible disk. The IFC 208 controls the local interface (USB/etc) 214 including a universal serial bus (USB), a serial port, and so forth. The NIC 209 is connected to the LAN 100 shown in FIG. 1 so that the NIC 209 controls network communications.

If processing requiring safety is performed between the devices that are connected to one another via a communication network, a security technology such as IPSec is often used so that settings are made between the devices on the one-to-one basis. In that case, information relating to the settings includes information that should be held in confidence. Further, if only a part of the set information is wrong, it becomes difficult to perform the processing. Moreover, since the setting making is complicated, profound knowledge and technologies are often required. Therefore, if predetermined processing is performed between the devices of the network system of the first embodiment, settings required for performing the predetermined processing are correctly and easily made, even though the settings are complicated. Hereinafter, exemplary operations of the network system are described.

The operations of the network system according to the first embodiment will be described in detail. FIG. 3 is a flowchart illustrating operations performed by the above-described network system, where the operations relate to the setting processing. Hereinafter, one-to-one security settings relating to data transfer performed between the MFP 101 and the PC 102 that are shown in FIG. 1 will be described.

First, in the MFP 101, an administrator or a user specifies required settings or settings that the administrator or the user wants to make according to a security-setting menu (not shown) of the MFP 101 by using the input unit 210 such as a keyboard and/or the display unit 211 such as a CRT-display unit. On the other hand, the MFP 101 inputs setting information indicating settings specified by the user, at step S301.

Next, if the user wants to transfer data between the MFP 101 and PC 102, the user specifies the address (IP address: 192.168.1.101) of the PC 102, the netmask corresponding to the PC 102, and a port number used by the PC 102 for transferring data. The MFP 101 transmits information about the above-described IP address, netmask, and port number that are specified by the user, at step S302. The setting information transmitted, at step S301 and step S302 is stored in the RAM 204 and/or the HDD 212.

Each of FIGS. 12 and 13 shows an exemplary record area onto which setting information transmitted according to a security-setting menu is recorded. Each of the above-described record areas is provided in the RAM 204 and/or the HDD 212.

First, the address information transmitted at step 302 is set to a record area 1201, as a destination address. Then, the netmask information transmitted at step 302 is set to a record area 1202, as a netmask of a destination-address. For example, "255.255.255.248" is set to the record area 1202. The term "netmask" denotes data indicating which bit of the IP address of each device represents the network address.

Next, since the MFP 101 is an information source in the first embodiment, "192.168.1.100" is set to the record area 1203, as a source address. Further, information about the netmask corresponding to the information source is written onto the record area 1204, as is the case with the netmask of the destination-address.

Further, information about a protocol number is set to a record area 1205, so as to specify the type of a protocol used for data transfer for which security settings are made. According to the specified protocol number, security settings may become effective for every data-transfer protocol used between the MFP 101 and the PC 102.

The port-number information transmitted at step 302 is set to a record area 1206, as a destination-port number. Information about a port number used by the information source for data transfer is set to a record area 1207, as a source-port number. Further, information about a processing method used for performing security processing is set to a record area 1208.

Information indicating that a bidirectional-transfer system is turned on and/or information indicating that the bidirectional-transfer system is turned off is set to a record area 1209, as information indicating directions in which data can be transferred while the above-described security settings are effective. If the bidirectional-transfer system is turned on, the above-described security settings are effective when bidirectional data transfer (transfer data from the MFP 101 to the PC 102 and vice versa) is performed. If the bidirectional-transfer system is turned off, the above-described security settings are effective only when data is transferred from one device to the other device (transfer data from the MFP 101 to the PC 102 in this embodiment).

FIG. 13 shows the record areas onto which detailed setting information items relating to the security settings are recorded. Information about a key-exchange mode is set to a record area 1301. The key-exchange mode shows how encryption keys are exchanged between the above-described devices. For example, if "internet key exchange (IKE)" is selected, as the key-exchange mode, main mode and/or aggressive mode can be selected.

Information about an address of the other end to which data is transferred (the PC 102 in the first embodiment) is set to a record area 1302, as the other-end address. Data on a private key (e.g., a one-byte character string) that is used immediately before data transfer is actually started is set to a record area 1303, as a pre-shared private key.

More detailed information about the security settings is set to a record area 1304, as a proposal. The proposal denotes a request transmitted from one of the devices (the MFP 101 in the first embodiment) to the other device (the PC 102 in the first embodiment). Several types of proposals can be specified so that the other device can select and use any one of the proposals, as required. The above-described proposal will be described later with reference to FIG. 6.

Now returning to FIG. 3, at step 303 the MFP 101 automatically generates setting information that should be transferred to the PC 102 on the basis of the information transmitted, at steps 301 and 302. The information generated at step 303 is shown in FIGS. 4 and 5, for example.

FIG. 4 shows record areas onto which the setting information generated at step 303 is recorded. Each of the record areas is provided in the RAM 204 and/or the HDD 212. Since the destination is the MFP 101 from the PC 102's perspective in the first embodiment, "192.168.1.100" is set to a record area 401, as the destination address. Then, "255.255.255.248" is set, for example, to a record area 402, for example, as the netmask of the destination-address.

Next, since the PC 102 is the information source from the PC 102's perspective in the first embodiment, "192.168.1.101" is set to a record area 403, as the source address. Further, information about the netmask corresponding to the information source is written onto a record area 404, as a netmask of a source-address, as is the case with the netmask of the destination-address.

Further, information about a protocol number is set to the record area 405, so as to specify the type of a protocol used for data transfer for which security settings are made. According to the specified protocol number, security settings may become effective for every data-transfer protocol used between the MFP 101 and the PC 102.

Information about a port number used by a destination device for data transfer is set to a record area 406, as a destination-port number. Further, information about a port number used by a source device for data transfer is set to a record area 407, as a source-port number. Information about a processing method used for performing security processing is set to a record area 408. Information indicating that the bidirectional-transfer system is turned on and/or information indicating that the bidirectional-transfer system is turned off is set to a record area 409, as information indicating directions in which data can be transferred while the above-described security settings are effective. If the bidirectional-transfer system is turned on, the above-described security settings are effective when bidirectional data transfer (transfer data from the MFP 101 to the PC 102 and vice versa) is performed. If the bidirectional-transfer system is turned off, the above-described security settings are effective only when data is transferred from one device to the other device (transfer data from the MFP 101 to the PC 102 in the first embodiment).

FIG. 5 shows record areas onto which detailed setting information items relating to the security settings are recorded. Each of the above-described record areas is provided in the RAM 204 and/or the HDD 212. Information about a key-exchange mode is set to a record area 501. The key-exchange mode shows how encryption keys are exchanged between the above-described devices. For example, if "internet key exchange (IKE)" is selected, as the key-exchange mode, each of main mode and aggressive mode can be selected.

Information about an address of the other end to which data is transferred (the MFP 101 in the first embodiment) is set to a record area 502, as the other-end address. Data on a private key (e.g., a one-byte character string) that is used immediately before data transfer is actually started is set to a record area 503, as a pre-shared private key.

More detailed information about the security settings is set to a record area 504, as a proposal. The proposal denotes a request transmitted from one of the devices (the MFP 101 in the first embodiment) to the other device (the PC 102 in the first embodiment). Several types of proposals can be specified so that the other device can select and use any one of the proposals, as required.

FIG. 6 shows an example proposal in detail. An authentication-algorithm field shows a method which allows the above-described devices to authenticate one another. An encrypted-algorithm field shows an encryption method actually used for performing data transfer. A lifetime-type field and a lifetime field show a time period and a data amount until the security-setting change is started. After a predetermined time period elapses since the security settings are made effective, or after a predetermined amount of data is transferred, the above-described device cancels the security settings according to information written in the lifetime field and exchanges the current key data with different new key data. Since a method adapted to cancel the security settings and start performing processing by using the different new key data is not essential to the present invention, the method will not be described.

The MFP 101 performs the following processing, so as to generate setting information relating to security settings on each of the above-described PCs. First, the MFP 101 sets information recorded onto the record areas 1201, 1202, and 1206 to the record areas 403, 404, and 407. Next, the MFP 101 sets information recorded onto the record areas 1203, 1204, and 1207 to the record areas 401, 402, and 406. Further, the MFP 101 sets the information recorded onto record areas 1205, 1208, and 1209 onto the record areas 405, 408, and 409, and sets the information recorded onto record areas 1301, 1302, 1303, and 1304 to the record areas 501, 502, 503, and 504. Thus, at step 303, the MFP 101 automatically generates setting information relating to security settings, where the generated setting information is transferred to the PC 102 which functions, as the other-end device (one of a pair of devices) to which data is transferred.

Referring back to FIG. 3, at step 304, the MFP 101 checks whether or not a safe data-transfer path exists on a communication path (the LAN 100 in the first embodiment) through which data is transferred between the MFP 101 and the PC 102, so as to transfer the generated setting information to the PC 102. However, since the communication path checked by the MFP 101 is a known data-transfer path, there may be no safe data-transfer path.

If there is no safe data-transfer path, the MFP 101 confirms whether or not the MFP 101 should be connected to the other-end device, at step 305. That is to say, the MFP 101 confirms whether or not processing should be continued, at step 305. In the first embodiment, a choice had been made so that the MFP 101 should not be connected to the other-end device when there is no safe data-transfer path (the above-described choice is made in advance, at step 301). Otherwise, the MFP 101 may ask the user (a user who had made the above-described choice, at step 301) whether or not the MFP 101 should be connected to the other-end device. If the user issues an instruction so that the MFP 101 should not be connected to the other-end device, the MFP 101 may abandon the security-setting information transmitted at step 301.

If it is confirmed that there is a known safe data-transfer path, or if it is confirmed that there is no safe data-transfer path and the processing should be continued, at step 304, the MFP 101 advances to step 306. Then, the MFP 101 transmits the setting information automatically generated at step 303 to the PC 102 functioning as the other-end device, at step 306.

At step 307, the PC 102 receives the setting information that relates to the security setting and that is transmitted at step 306, makes security settings according to the setting information, and makes preparations for making the security settings effective. That is to say, at step 307, the PC 102 only makes the above-described preparations and does not actually make the security settings effective. When the PC 102 is used, the user can specify required settings from the security-setting menu of the PC 102 by using an input unit such as a keyboard and/or a display unit such as a CRT-display unit. However, when the PC 102 makes the security settings, at step 306, setting information transmitted from the MFP 101 is set to a record area onto which the setting information transmitted according to the security-setting menu of the PC 102 should be recorded.

After making the preparations for the security settings generated on the basis of the transmitted setting information, the PC 102 transfers a signal indicating that the preparations are made to the MFP 101, at step 308. The above-described signal may include any type of data so long as the MFP 101 is informed that the security-setting preparations are made.

Immediately after the above-described signal is transferred to the MFP 101, the PC 102 makes the prepared security settings effective, at step 309. On the other hand, upon receiving the above-described signal transmitted from the PC 102, the MFP 101 makes the security settings transmitted at step 301 effective, at step 310.

Subsequently, it becomes possible to transfer data with security between the above-described two devices, that is, the MFP 101 and the PC 102, by using the security settings on the port and/or protocol specified by the setting information transmitted at step 301.

Thus, when the one-to-one-basis settings are required for transferring data between two devices of the above-described devices in the network system of the first embodiment, for example, the user makes the security settings only for one of the two devices so that setting information is automatically generated for the other device. Further, the generated setting information is transmitted to the other device so that security settings are made on the basis of the transmitted setting information by the other device. Thus, if the user makes complicated settings only for one of the two devices, setting information for the other device is automatically generated. Subsequently, it becomes possible to reduce a work load on an administrator of the devices and data-transfer problems that occur due to an operation error made by the administrator.

In the first embodiment, one device of the above-described two devices (the MFP 101 or the like) transmits security-setting information to the other device (the PC 102 or the like). When the other device transmits the signal indicating that the security-setting preparations are made back to one of the above-described two devices according to the setting information transmitted to the other device, newly set security settings are actually made effective. However, the present invention is not limited to the first embodiment. Namely, as shown in FIG. 7, data on start time where the settings are made effective is written in the security-setting information transmitted from the one device to the other device. If each of the two devices actually makes the security settings effective according to the start-time data, advantages of the present invention are not compromised. Each of the devices may acquire time data from a real-time clock (RTC) provided therein.

Further, in addition to the start-time information item of the security-setting information, information about the address of a network-time protocol (NTP) server may be added to the security-setting information, as shown in FIG. 7. Each of the two devices accesses the NTP server according to the address of the NTP server, acquires time information from the NTP server, and actually makes the security settings effective at the time corresponding to the written start-time information.

Thus, as has been described in the first embodiment, each of the two devices makes the security settings effective at predetermined time (e.g., specified time). However, it may be configured that each of the two devices makes preparations relating to the security settings and stores information relating to the security settings in a non-volatile record unit (the ROM 203 and/or the HDD 212, for example). Then, if the power of the device is turned off and turned on again, the security settings generated according to the stored security-setting information may be made effective. Further, it may be configured that the device is reset so that when the power of the device is turned off, the device performs the same operations as those performed when the power is turned on again, and the security settings generated according to the stored security-setting information are made effective.

Second Exemplary Embodiment

Next, a second exemplary embodiment of the present invention will be described. In the first embodiment, the setting information automatically generated by one of the two devices is transmitted from the one device to the other device via the network. In a network system according to the second embodiment, however, setting information automatically generated by one of the two devices is transmitted to the other device by using a portable recording medium.

Since the network system of the second embodiment and devices provided therein have the same configurations as those of the first embodiment, the description thereof is omitted and a description only of operations of the network system of the second embodiment is provided with reference to FIGS. 1 and 2, as required. In the following description, one-to-one-basis security settings relating to data transfer (network communications) performed between the MFP 101 and the PC 102 that are shown in FIG. 1 are illustrated, for example.

First, operations performed by the MFP 101 according to the second embodiment will be described. FIG. 8 is a flowchart showing exemplary operations performed by the MFP 101 of the second embodiment.

First, a network administrator or the like specifies settings required for performing network communications between the MFP 101 and the PC 102 from a security-setting menu (not shown) of the MFP 101 by using the input unit 210 such as a keyboard and/or the display unit 211 such as a CRT-display unit. Then, the MFP 101 inputs information indicating the settings specified by the network administrator or the like, at step S801. The information transmitted at step S801 is stored in the RAM 204 and/or the HDD 212. Each of the FIGS. 12 and 13 shows record areas onto which the setting information transmitted according to the security-setting menu is recorded. Each of the record areas is provided in the RAM 204 and/or the HDD 212. Then, at step S802, the MFP 101 waits until a portable recording medium is inserted into the disk unit (FD/etc) 213 and/or the local interface (USB/etc) 214. Here, the portable recording medium can be inserted in each of the above-described units in a removable manner. The portable recording medium may be a USB memory, for example.

When the portable recording medium is inserted into the disk unit (FD/etc) 213 and/or the local interface (USB/etc) 214, for example, the MFP 101 advances to step S803 so that the MFP 101 automatically generates setting information that should be used by the PC 102 on the basis of the setting information transmitted at step S801. The setting information generated at step S803 is shown in FIGS. 4 and 5, for example.

Thus, at step S803, the MFP 101 automatically generates the setting information relating to the security settings on the PC 102 which is the other device (one of the pair of devices) to which data is transferred from the MFP 101. Next, at step S804, the MFP 101 writes the setting information generated at step S803 onto the portable recording medium inserted in the disk unit 213 and/or the local interface 214, for example.

After the security-setting information used by the PC 102 is written onto the portable recording medium, the MFP 101 makes the display unit 211 produce a message which says that the portable recording medium may be removed, at step S805. When the portable recording medium is removed from the MFP 101 by the network administrator or the like, the processing is terminated.

Figure 9:
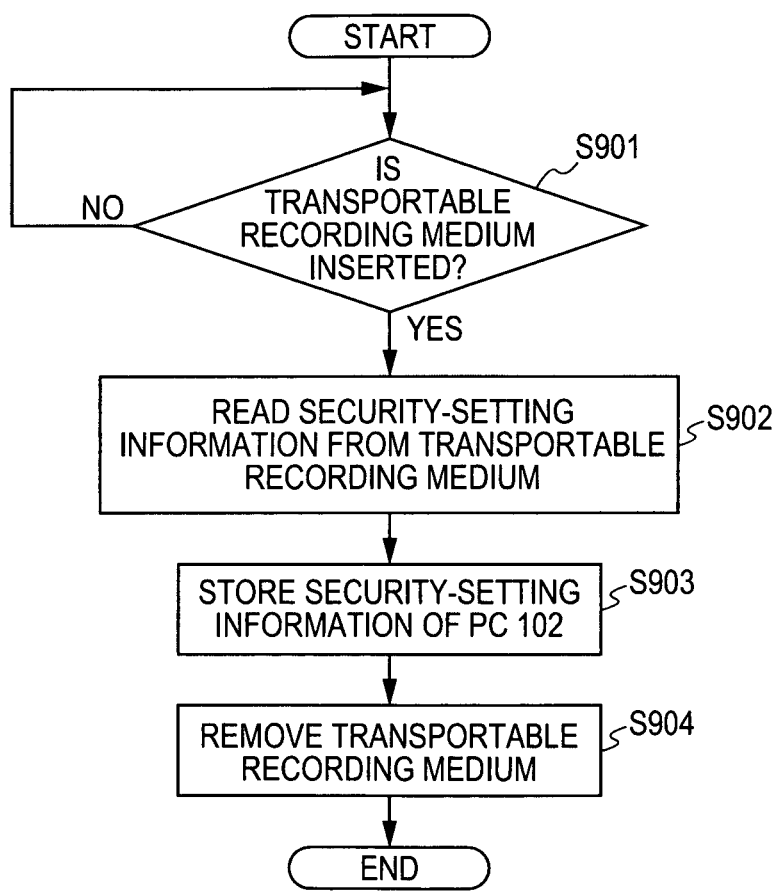
FIG. 9 is a flowchart showing exemplary operations of a PC according to the second embodiment.

FIG. 9 is a flowchart showing exemplary operations performed by the PC 102 of the second embodiment. First, at step S901, the PC 102 waits until a portable recording medium is inserted in the disk unit (FD/etc) 213 and/or the local interface (USB/etc) 214 of the PC 102 by the network administrator, for example. It is to be noted that the security-setting information used by the PC 102, the security-setting information having been automatically generated by the MFP 101, is recorded onto the portable recording medium by the above-described processing performed from step S801 to step S805, as shown in FIG. 8.

When the portable recording medium is inserted in the disk unit (FD/etc) 213 and/or the local interface (USB/etc) 214, the PC 102 advances to step S902, so as to read the security-setting information thereof from the inserted portable recording medium.

Next, at step S903, the PC 102 makes security settings of its own on the basis of the security-setting information read from the portable recording medium at step S902. When using the PC 102, the user can specify required settings from the security-setting menu of the PC 102 by using the input unit 210 such as a keyboard and/or the display unit 211 such as a CRT-display unit. However, when the PC 102 makes the security settings, at step S903, the setting information read from the portable recording medium is set to a record area onto which setting information transmitted according to the security-setting menu of the PC 102 should be recorded.

When the security settings are made in the PC 102, the PC 102 advances to step S904 so that the PC 102 makes the display unit 211 produce a message indicating that the portable recording medium may be removed. When the portable recording medium inserted in the disk unit 213 and/or the local interface 214 is removed by the network administrator or the like, the processing is terminated.

Thus, data can be safely transferred between the above-described two devices, that is, the MFP 101 and the PC 102 due to the security settings generated on the basis of a port number and/or a protocol specified by the setting information transmitted at step S801.

Thus, according to the second embodiment, the same advantages as those of the first embodiment can be obtained. Further, in the second embodiment, the setting information automatically generated by one of the two devices is transmitted from the one device to the other device via the portable recording medium and security settings are made by the other device on the basis of the automatically generated setting information. Subsequently, the setting information relating to the security settings does not flow on the network. Therefore, it becomes possible to prevent the setting information from being seen by an outsider, whereby the security settings can be made with safety.

Third Exemplary Embodiment

Next, a third exemplary embodiment of the present invention will be described. In a network system according to the third embodiment, setting information automatically generated by one of two devices is transmitted to the other device by using a portable recording medium, when the one-to-one-basis settings are required for performing predetermined processing between the two devices. Further, each of the devices determines whether the setting information stored in the portable recording medium is setting information generated for itself or a different device.

Since the network system of the third embodiment and devices provided therein have the same configurations as those of the first embodiment, the description thereof is omitted. That is to say, a description only of operations of the network system of the third embodiment is provided. In the following description, one-to-one-basis security settings relating to data transfer are made for each of pairs of devices such as the MFP 101 and the PC 102, and the MFP 101 and the PC 103 that are shown in FIG. 1, so as to perform network communications between the MFP 101 and the PC 102, and the MFP 101 and the PC 103, for example.

Figure 10:
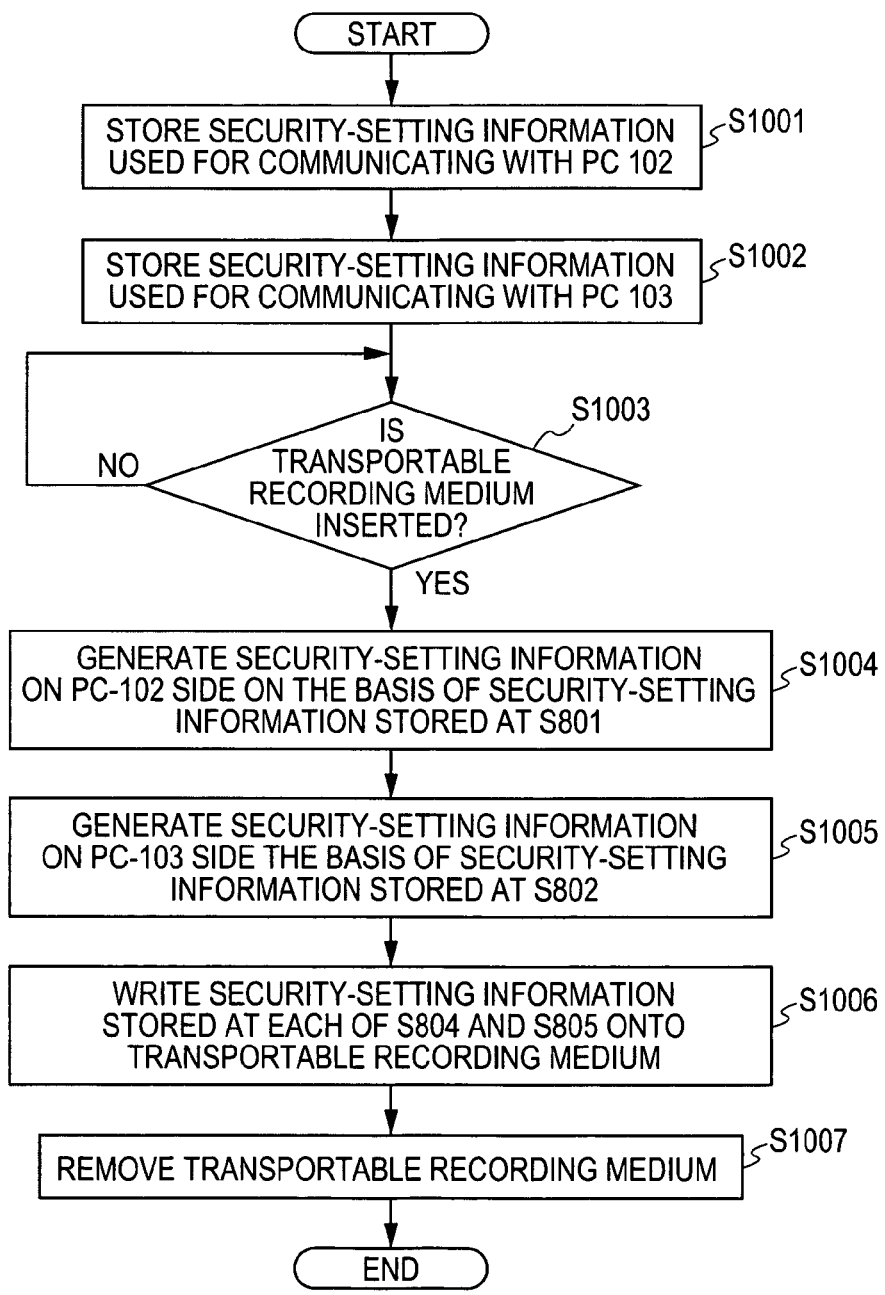
FIG. 10 is a flowchart showing exemplary operations of an MFP according to a third embodiment of the present invention.

Exemplary operations of the MFP 101 according to the third embodiment will now be described with reference to a flowchart of FIG. 10. First, a network administrator or the like specifies settings required for performing network communications between the MFP 101 and the PC 102 from a security-setting menu (not shown) of the MFP 101 by using the input unit 210 such as a keyboard and/or the display unit 211 such as a CRT-display unit. Then, the MFP 101 inputs information indicating the settings specified by the network administrator or the like, at step S1001. After that, the network administrator or the like specifies settings required for performing network communications between the MFP 101 and the PC 103 from the security-setting menu (not shown) of the MFP 101 by using the input unit 210 and/or the display unit 211. Then, the MFP 101 transmits information indicating the settings specified by the network administrator or the like, at step S1002, as is the case with step S1001. Each of the setting information transmitted at step S1001 and the setting information transmitted at step S1002 is stored in the RAM 204 and/or the HDD 212, respectively. Next, at step S1003, the MFP 101 waits until a portable recording medium is inserted into the disk unit (FD/etc) 213 and/or the local interface (USB/etc) 214. Here, the portable recording medium denotes a USB memory, for example.

When the network administrator or the like inserts the portable recording medium into the disk unit (FD/etc) 213 and/or the local interface (USB/etc) 214, for example, the MFP 101 advances to step S1004 so that the MFP 101 automatically generates setting information that should be used by the PC 102 on the basis of the setting information transmitted at step S1001. The setting information generated at step S1004 corresponds to the information shown in FIGS. 4 and 5, for example.

Next, at step S1005, the MFP 101 automatically generates setting information that should be used by the PC 103 on the basis of the information transmitted at step S1002. The setting information generated at step S1005 corresponds to the information shown in FIGS. 4 and 5, for example, as is the case with the setting information generated at step S1004. However, according to the setting information generated at step S1004, for example, the PC 102's address shown as "192.168.1.101" becomes a source address. Further, according to the setting information generated at step S1005, the PC 103's address shown as "192.168.1.102" becomes the source address.

Next, at step S1006, the MFP 101 writes the setting information generated at step S1004 and the setting information generated at step S1005 onto the portable recording medium inserted into the disk unit 213 and/or the local interface 214, for example.

After the MFP 101 writes the setting information relating to the security settings of each of the PC 102 and the PC 103 onto the portable recording medium, the MFP 101 advances to step S1007 so that the MFP 101 makes the display unit 211 produce a message which says that the portable recording medium may be removed. When the portable recording medium is removed from the MFP 101 by the network administrator or the like, the processing is terminated. In FIG. 10, the MFP 101 performs processing relating to the PC 102, and performs processing relating to the PC 103. However, without being limited to the third embodiment, the MFP 101 may perform the processing relating to the PC 103 first, as required.

Figure 11:
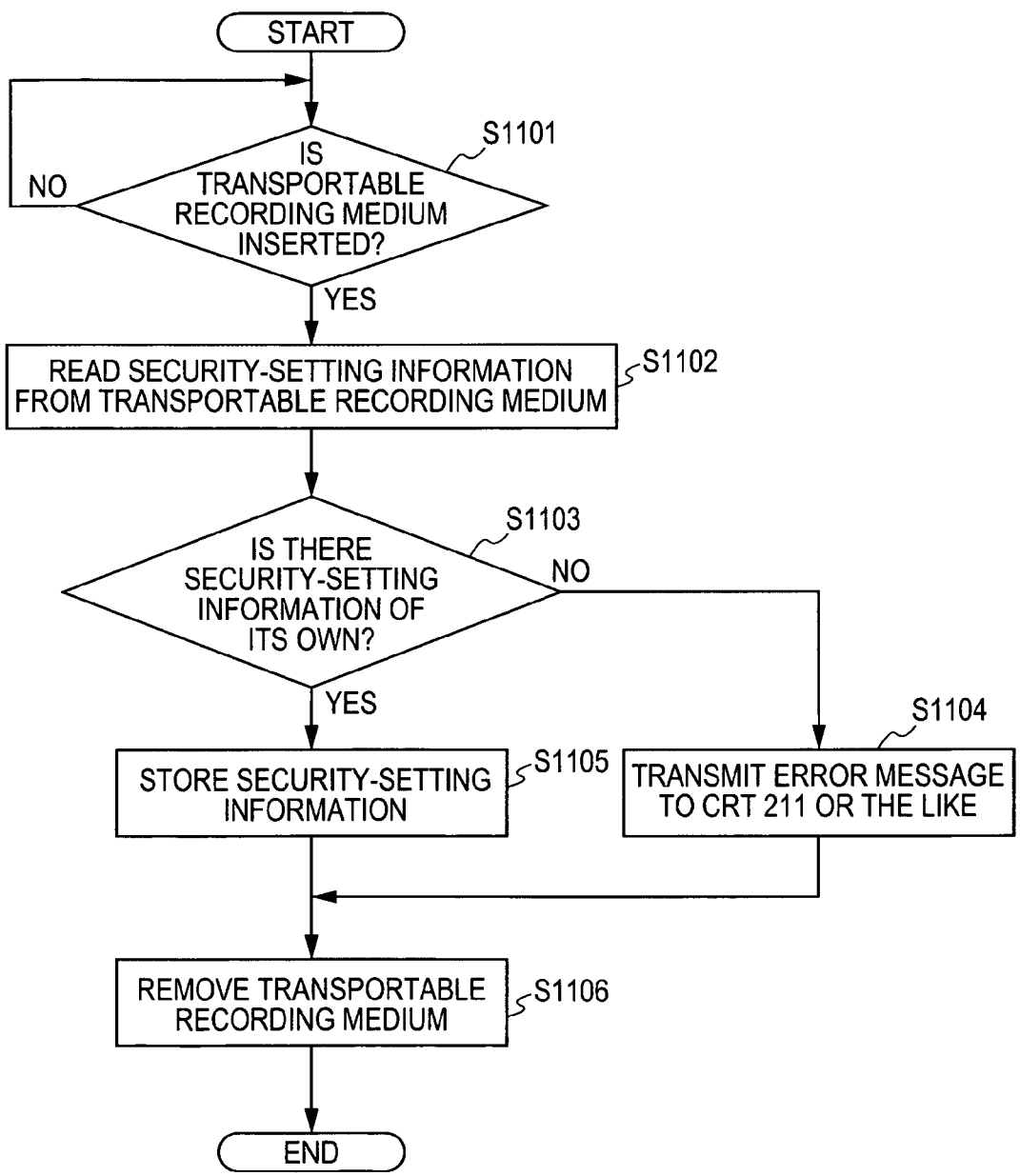
FIG. 11 is a flowchart showing exemplary operations of a PC according to the third embodiment.

Next, operations of the PC 102 and/or the PC 103 according to the third embodiment will be described with reference to FIG. 11 which shows a flowchart illustrating the operations of the PC 102 according to the third embodiment. The PC 103 performs similar operations as those performed by the PC 102 according to the flowchart shown in FIG. 11. First, at step S1101, the PC 102 waits until a portable recording medium is inserted into the disk unit (FD/etc) 213 and/or the local interface (USB/etc) 214 of the PC 102 by the network administrator or the like. When the portable recording medium is inserted in the disk unit (FD/etc) 213 and/or the local interface (USB/etc) 214, the PC 102 advances to step S1102, so as to read the security-setting information from the inserted portable recording medium.

Next, at step S1103, the PC 102 determines whether or not the security-setting information read from the portable recording medium includes setting information showing the address of the PC 102, as a source address. In the third embodiment, the address of the PC 102 is shown as "192.168.1.101". Therefore, the PC 102 determines whether or not the security-setting information read from the portable recording medium includes setting information showing that the source address is "192.168.1.101".

If it is determined that no setting information shows that the address of the PC 102 is the source address, at step S1103, the PC 102 advances to step S1104, so as to make the display unit (CRT) 211 produce an error message indicating that there is no setting information for the PC 102. After that, the PC 102 advances to step S1106 without making security settings. At step S1106, the PC 102 makes the display unit 211 produce a message indicating that the portable recording medium may be removed. When the portable recording medium is removed by the network administrator or the like, the processing is terminated.

On the contrary, if it is determined that there is the setting information showing that the address of the PC 102 is the source address, at step S1103, the PC 102 advances to step S1105, so as to make security settings of its own on the basis of the above-described setting information. When the PC 102 makes the security settings, at step S1105, the setting information read from the portable recording medium is set to a record area onto which setting information transmitted according to the security-setting menu of the PC 102 should be recorded.

When the security settings are made, the PC 102 advances to step S1106 so that the PC 102 makes the display unit 211 produce a message indicating that the portable recording medium may be removed. When the portable recording medium inserted into the disk unit 213 and/or the local interface 214 is removed by the network administrator or the like, the processing is terminated.

Next, the operations of the PC 103 according to the third embodiment will be described with reference to FIG. 11, as is the case with the operations of the PC 102. First, at step S1101, the PC 103 waits until a portable recording medium is inserted into the disk unit (FD/etc) 213 and/or the local interface (USB/etc) 214 of the PC 103 by the network administrator or the like. When the portable recording medium is inserted into the disk unit (FD/etc) 213 and/or the local interface (USB/etc) 214, the PC 103 advances to step S1102, so as to read the security-setting information from the inserted portable recording medium.

Next, at step S1103, the PC 103 determines whether or not the security-setting information read from the portable recording medium at step S1102 includes setting information showing the address of the PC 103, as a source address. In the third embodiment, the address of the PC 103 is shown as "192.168.1.102". Therefore, the PC 103 determines whether or not the security-setting information read from the portable recording medium includes setting information showing that the source address is shown as "192.168.1.102".

If it is determined that there is no setting information showing that the address of the PC 103 is the source address, the PC 103 advances to step S1104, so as to make the display unit (CRT) 211 or the like produce an error message indicating that there is no setting information generated for the PC 103. After that, the PC 103 advances to step S1106 without making security settings. At step S1106, the PC 103 makes the display unit 211 produce a message indicating that the portable recording medium may be removed. When the portable recording medium is removed by the network administrator or the like, the processing is terminated.

On the contrary, if it is determined that there is the setting information showing that the address of the PC 103 is the source address, at step S1103, the PC 103 advances to step S1105, so as to make security settings of its own on the basis of the above-described setting information.

After making the security settings, the PC 103 advances to step S1106 so that the PC 103 makes the display unit 211 produce a message indicating that the portable recording medium may be removed. When the portable recording medium inserted into the disk unit 213 and/or the local interface 214 is removed by the network administrator or the like, the PC 103 terminates the processing.

When the PC 103 makes the security settings, at step S1105, the setting information read from the portable recording medium is set to a record area onto which setting information transmitted according to the security-setting menu of the PC 103 should be recorded.

Thus, data can be safely transferred between the MFP 101 and the PC 102 due to the security settings generated on the basis of a port number and/or a protocol specified by the setting information transmitted at step S1001. Further, data can be safely transferred between the MFP 101 and the PC 103 due to the security settings generated on the basis of a port number and/or a protocol specified by the setting information transmitted at step S1002.

As described above, the third embodiment allows for achieving the same advantages as those of the first and second embodiments. Further, each of the devices determines whether or not the setting information read from the portable recording medium is provided for itself and makes security settings on the basis of the determination result. That is to say, each of the devices can make appropriate security settings on the basis only of the setting information provided for itself.

Other Exemplary Embodiments, Features and Aspects of the Present Invention

It is to be understood that the present invention can also be achieved by supplying program code of software for implementing the functions of the above-described embodiments to a system and/or apparatus so that a computer (CPU and/or MPU) of the system or apparatus makes the system and/or apparatus operate according to the program code.

In that case, the program code itself achieves the functions of the above-described embodiments, and thus the program code itself constitutes the present invention. Further, a device for supplying the above-described program code to the computer, that is, a recording medium or the like storing the above-described program code also constitutes the present invention.

The recording medium storing the program code may be, for example, a flexible disk, a hard disk, an optical disk, a magneto-optical disk, a CD-ROM, a magnetic tape, a non-volatile memory card, a ROM, etc. Further, if the above-described program code is stored in the portable recording medium according to the second embodiment and/or the third embodiment, it is also one of embodiments of the present invention.

Furthermore, not only by the computer executing the supplied program code, but also by the program code collaborating with an operating system (OS), or other application software, etc. running on the computer, the functions of the above-described embodiments may be achieved. The latter is also one of embodiments of the present invention.

In another embodiment of the present invention, the supplied program code may be written into a memory of a function extension board inserted in the computer or a function extension device connected to the computer. Then, a CPU or the like provided in the function extension board and/or the function extension device may execute part of or the entire process on the basis of instructions of the program code.

While the present invention has been described with reference to the above-described embodiments, it is to be understood that the technical scope of the invention is not limited to the above-described embodiments. The scope of the following claims is to be accorded the broadest interpretation so as to encompass all modifications, equivalent structures and functions without leaving the technical spirit and main features of the present invention.

This application claims the benefit of Japanese Application No. 2005-80235 filed on Mar. 18, 2005 and No. 2005-239029 filed on Aug. 19, 2005, which are hereby incorporated by reference herein in their entirety.

What is claimed is:

1. A communication system for performing Internet Protocol Security (IPSec) communication between a first device and a second device, the communication system comprising:
   the first device which comprises:
     a first setting unit configured to set to the first device, based on information specified by a user, first IPSec setting information in which the first device is designated as a source device and the second device is designated as a destination device,
     a generation unit configured to automatically generate, based on the first IPSec setting information set by the first setting unit, second IPSec setting information for the second device, by interchanging source device information and destination device information included in the first IPSec setting information, wherein the second device is designated as a source device and the first device is designated as a destination device in the generated second IPSec setting information, and
     a transmission unit configured to transmit the second IPSec setting information generated by the generation unit to the second device; and
   the second device which comprises:
     a second setting unit configured to set the second IPSec setting information transmitted from the transmission unit to the second device.

2. The communication system according to claim 1, wherein each of the first IPSec setting information and the second IPSec setting information is set so that data can be transferred between the first device and the second device with security.

3. The communication system according to claim 1, wherein the second device further comprises;
   a notification unit configured to notify the first device that the second IPSec setting information set to the second device is made effective.

4. The communication system according to claim 1, wherein the second IPSec setting information includes information about a start-time in response to the second IPSec setting information set to the second device by the second setting unit being made effective, and wherein the second IPSec setting information set by the second setting unit is used according to the start-time information.

5. A communication system for performing Internet Protocol Security (IPSec) communication between a first and second device, the communication system comprising:
   the first device which comprises:
     a first setting unit configured to set to the first device, based on information specified by a user, first IPSec setting information in which the first device is designated as a source device and the second device is designated as a destination device, a generation unit configured to automatically generate, based on the first IPSec setting information set by the first setting unit, second IPSec setting information for the second device, by interchanging source device information and destination device information included in the first IPSec setting information, wherein the second device is designated as a source device and the first device is designated as a destination device in the generated second IPSec setting information, and a writing unit configured to write the second IPSec setting information generated by the generation unit onto a portable recording medium; and the second device which comprises;

a reading unit configured to read the written second IPSec setting information from the portable recording medium in response to the portable recording medium being connected to the second device, and a second setting unit configured to set the second IPSec setting information read by the reading unit to the second device.

6. The communication system according to claim 5, wherein the second device further comprises:

a determination unit configured to determine whether IPSec setting information read by the reading unit is the second IPSec setting information provided for the second device, wherein, in response to the determination unit determining that the IPSec setting information read by the reading unit is the second IPSec setting information provided for the second device, the second setting unit sets the second IPSec setting information by the reading unit to the second device.

7. The communication system according to claim 5, wherein each of the first IPSec setting information and the second IPSec setting information is set so that data can be transferred between the first device and the second device with security.

8. A method for a communication system to perform Internet Protocol Security (IPSec) communication between a first device and a second device, the method comprising:

setting, to the first device and based on information specified by a user, first IPSec setting information in which the first device is designated as a source device and the second device is designated as a destination device;

automatically generating, in the first device and based on the set first IPSec setting information, second IPSec setting information for the second device, by interchanging source device information and destination device information included in the first IPSec setting information, wherein the second device is designated as a source device and the first device is designated as a destination device in the generated second IPSec setting information;

transmitting, using the first device, the generated second IPSec setting information to the second device; and setting, using the second device, the second IPSec setting information transmitted to the second device.

9. A method for a communication system to perform Internet Protocol Security (IPSec) communication between a first and second device, the method comprising:

setting, to the first device, based on information specified by a user, first IPSec setting information in which the first device is designated as a source device and the second device is designated as a destination device;

automatically generating, using the first device and based on the set first IPSec setting information, second IPSec setting information for the second device, by interchanging source device information and destination device information included in the first IPSec setting information, wherein the second device is designated as a source device and the first device is designated as a destination device in the generated second IPSec setting information;

writing, using the first device, the generated second IPSec setting information onto a portable recording medium;

reading, using the second device, the written second IPSec setting information from the portable recording medium in response to the portable recording medium being connected to the second device; and setting, using the second device, the read second IPSec setting information to the second device.

10. A non-transitory computer-readable medium storing a program that causes a communication system to perform a method for performing Internet Protocol Security (IPSec) communication between a first device and a second device, the method comprising:

setting, to the first device and based on information specified by a user, first IPSec setting information in which a the first device is designated as a source device and the second device is designated as a destination device;

automatically generating, in the first device and based on the set first IPSec setting information, second IPSec setting information for the second device, by interchanging source device information and destination device information included in the first IPSec setting information, wherein the second device is designated as a source device and the first device is designated as a destination device in the generated second IPSec setting information;

transmitting, using the first device, the generated second IPSec setting information to the second device; and setting, using the second device, the second IPSec setting information transmitted to the second device.

11. A non-transitory computer-readable medium storing a program that causes a communication system to perform a method for performing Internet Protocol Security (IPSec) communication between a first and second device, the method comprising:

setting, to the first device, based on information specified by a user, first IPSec setting information in which the first device is designated as a source device and the second device is designated as a destination device;

automatically generating, using the first device and based on the set first IPSec setting information, second IPSec setting information for the second device, by interchanging source device information and destination device information included in the first IPSec setting information, wherein the second device is designated as a source device and the first device is designated as a destination device in the generated second IPSec setting information;

writing, using the first device, the generated second IPSec setting information onto a portable recording medium;

reading, using the second device, the written second IPSec setting information from the portable recording medium in response to the portable recording medium being connected to the second device; and setting, using the second device, the read second IPSec setting information to the second device.

* * * * *